US008234943B2

(12) United States Patent
Peng et al.

(10) Patent No.: US 8,234,943 B2
(45) Date of Patent: Aug. 7, 2012

(54) APPARATUS AND METHOD FOR GYROSCOPIC PROPULSION

(75) Inventors: Martin Peng, Kingston, TN (US); Kelly Tippett, Chandler, AZ (US)

(73) Assignee: Ganid Productions, LLC, Mesa, AZ (US)

( * ) Notice: Subject to any disclaimer, the term of this patent is extended or adjusted under 35 U.S.C. 154(b) by 1018 days.

(21) Appl. No.: 12/136,047

(22) Filed: Jun. 9, 2008

(65) Prior Publication Data

US 2008/0302183 A1    Dec. 11, 2008

Related U.S. Application Data

(60) Continuation-in-part of application No. 11/581,809, filed on Oct. 16, 2006, now Pat. No. 7,383,747, which is a division of application No. 10/770,795, filed on Feb. 3, 2004, now Pat. No. 7,121,159, which is a continuation-in-part of application No. 10/087,430, filed on Mar. 1, 2002, now Pat. No. 6,705,174.

(51) Int. Cl.
*G01C 19/06* (2006.01)
*G01C 19/02* (2006.01)
(52) U.S. Cl. .......................................... 74/5.37; 74/5.22
(58) Field of Classification Search .................. 74/5.22, 74/5.34, 5.37, 5.4, 5.7, 5.95, 84 S, 84 R
See application file for complete search history.

(56) References Cited

U.S. PATENT DOCUMENTS

| 3,424,401 | A | * | 1/1969 | Maurer | 244/165 |
| 4,230,294 | A | * | 10/1980 | Pistiner | 244/170 |
| 5,871,249 | A | * | 2/1999 | Williams | 294/86.41 |
| 6,232,671 | B1 | * | 5/2001 | Gottfried, Jr. | 290/1 R |
| 2005/0204817 | A1 | * | 9/2005 | Boletis et al. | 73/514.18 |

FOREIGN PATENT DOCUMENTS

| GB | 2207753 A | * | 2/1989 |
| WO | WO8911632 A1 | * | 11/1989 |

* cited by examiner

*Primary Examiner* — Roger Pang
(74) *Attorney, Agent, or Firm* — Wright Law Group, PLLC; Mark F. Wright (57) ABSTRACT

Disclosed is a combination of six substantially identical interconnected rotating masses, with a pair each of the rotating masses being configured to rotate in one of each of the three planes (X, Y, and Z). Regardless of the orientation of the six masses, each pair of the six interconnected rotating masses may share substantially the same center of gravity and generate a separate yet interactive kinetic energy and angular momentum in each of the three planes, thereby providing resistance to rotational forces from external sources. This is known as "equal force presence. In one embodiment, the rotating masses are ring-like masses. In alternative embodiment, the rotating masses are solid masses, similar to flywheels.

12 Claims, 10 Drawing Sheets

APPARATUS AND METHOD FOR GYROSCOPIC PROPULSION

RELATED APPLICATIONS

This application is a continuation in part of U.S. patent application Ser. No. 11/581,809, filed on Oct. 16, 2006 now U.S. Pat. No. 7,383,747, which application is now pending and which application is a divisional of U.S. patent application Ser. No. 10/770,795, filed on Feb. 3, 2004, now issued as U.S. Pat. No. 7,121,159 and which patent is a continuation-in-part of U.S. patent application Ser. No. 10/087,430, filed on Mar. 1, 2002, now issued as U.S. Pat. No. 6,705,174, all of which are incorporated herein by reference.

BACKGROUND OF THE INVENTION

1. Technical Field

The present invention relates generally to rotational forces and more specifically relates to creating a linear movement from a system of rotational forces.

2. Background Art

Propulsion of an object not in contact with a relatively fixed body, for example the ground or a planet surface, is generally obtained only by movement of air or other gases in a direction substantially opposite to the movement of the object under the effect of the propulsion systems. In the absence of a suitable atmosphere, for example in space, propulsion is generally obtained by rocket systems or by other similar systems which involve the projection of particles at high velocity from the object, in the opposite direction of the object's intended travel. Such systems, by their very nature and design, require the consumption of significant quantities of fuel since the fuel or the byproducts of the consumption or expulsion of the fuel forms the particles to be projected.

Attempts have been made for many years to develop a propulsion system, which generates linear movement from a rotational drive. Examples of this type of arrangement are shown in a book entitled "The Death of Rocketry" published in 1980 by Joel Dickenson and Robert Cook.

However none of these previous arrangements has in any way proved satisfactory and if any propulsive effect has been obtained this has been limited to simple models. One of the problems with the previous attempts is the limited understanding of the true nature of the laws of motion and the nature of the physical universe. The laws of motion, as currently defined and used in the scientific community, are only accurate to a limited degree of precision. Many conditions and qualifications are required to apply them to the physical world, as it actually exists. This is far truer for the quantification of angular motion than it is for more linear motion. The laws of motion postulated by Newton are built upon his first law of inertia and are generally regarded as the foundation of Einstein's theory of relativity.

In the cosmos, everything is moving and there is no object that is perfectly static and motionless. The very first law of physics involves concepts that are only proper in a given frame of reference. Consider a body "at rest." The idea of "at rest" implies a lack of motion. However, the object is only "at rest" with respect to the relative motion of the object's immediate environment. Matter "at rest" is actually moving in patterns of motion that create the appearance of static motionlessness, yet the accumulated energies within the matter, in addition to the relative motion of the composite cosmic environment, is well known and provides sufficient evidence that everything is in a state of constant motion. Inertia, as it is generally referred to in relation to the laws of physics, represents relatively balanced force relationships creating relatively constant and stable motion patterns.

The basic formulas typically used to describe various angular forces are sufficient to explain only the most basic concepts relative to the behavior of spinning masses. They are the accepted formulas of Newtonian physics for linear motion applied to rotation with the linear components exchanged for angular ones. Rotational inertia is generally defined with the appropriate embellishments necessary to include the shape of the mass about the axis of rotation as an additional factor in the magnitude of the inertia.

Newton's first law of motion dealing with inertia and the inertial reference frames used in the calculation of linear forces do not, in the strictest sense, apply to rotational force associations. Inertial reference frames are usually linear by qualification and rotating frames of reference are never inertial. This fact is not a significant factor to include in the calculations of most linear forces. In most cases of ordinary motion, the angular components in the inertial reference frame are negligible. For example, air resistance is frequently a negligible factor in certain cases and, in those cases, can therefore be ignored. Or as the limitations of the linear velocity of things is ignored unless sufficiently close to the recognized maximum. Similarly, the non-linear components of most inertial reference frames ignored, and can be, for most ordinary kinds of motion. The additional factor of shape forever qualifies the angular motion aspects of particle associations with respect to the force of that association. This is the most meaningful and valuable factor separating the behavior of angular force from linear force.

Motion on a scale large enough with respect to the earth and the cosmic environment to be substantially non-linear can never be ignored. And this is not the case with most kinds of ordinary motion. In the fundamentals of physics, this fact is considered significant only for large-scale motions such as wind and ocean currents, yet "strictly speaking" the earth is not an inertial frame of reference because of its rotation. The earth's non-linear character is observed in the case of the Foucault pendulum, the Coriolis Effect, and also in the case of a falling object which does not fall "straight" down but veers a little, with the amount of deviation from its path dependant on the period of time that elapses during the fall. All events are subject to this fact to a greater or lesser extent.

The mathematical purpose of inertial reference frames is to isolate a motion event in order to identify force components. Acceleration will only be observed in systems that have a net force in a given direction and are not balanced or zero. Since this is only valid for the linear components of motion, it works well for all kinds of motion phenomena that are primarily linear in nature; the associated angular component being either idealized or considered negligible. Only the linear force aspects of any of these measurements hold precisely true to the formulas of mathematics describing them. To the degree that angular components of motion are associated with the reference frame used for measuring and calculating force relationships, and to the extent which these angular components are not included in the formulas for calculation, is to the degree these formulas are in error. The fact that angular reference frames cannot and do not represent inertial reference frames indicates that the effect of angular force is not so easily isolated in order to identify component effects.

Mathematical analysis of rotational forces reveals that the formulas describing rotational motion are also limited in additional respects. Motions that include anything more than ninety degrees of rotation cannot be used as true vectors. The fundamental technique of vectors, used to determine the composite result of the effect of multiple forces, will not work for rotational motion due to the inherent lack of integrity in the model. Individual angular displacements, unless they are small, can't be treated as vectors, though magnitude and direction of rotational velocity at a particular point in time and space can be given, which is necessary. But this alone is not sufficient, because the rules of vector mathematics do not hold with regard to the order of the addition of these forces.

If the displacement of an object is given by a series of rotational motions, the resulting angular position of the object is different depending on the order of the sequence of angular motions. Vector mathematics requires that addition be commutative (a+b+c=c+b+a). To calculate the motion of the precessional adjustments which multiple disturbing torques have on a spinning mass in a dynamic environment requires extremely complex mathematical calculations and is not accounted for in the previous attempts to translate rotational energy into linear movement.

The fact that these precessional adjustments can be affected by a strong magnetic field, and that there are no mathematical formulas that include this phenomenon as a factor of calculation, demonstrates that angular momentum is not fully predictable by the current formulas of mathematics and this is why there has been no true success in developing an apparatus which can efficiently and effectively use the angular momentum of a spinning mass to create a controlled linear movement.

The simple systems of motion that involve a magnitude of angular momentum that is relatively large with respect to the mass of the rotating body all exhibit nuances or nutation of precessional adjustment not described by the force components given by the accepted formulas of physics for angular motion. The Levitron is one excellent example, and there are additional examples that reveal how the rotating systems of motion in the natural environment are significantly more complicated than is typically described by the formulas associated with these patterns.

When these motions are recreated, using the accepted formulas for these patterns, the motion is not at all like the naturally observed versions and is sterile and fixed, lacking the nuances and nutation that exist in the cosmic environment. The nuances and nutation of spinning motions observed in nature are typically complex composite angular effects of the local cosmic environment, down to and including the immediate angular motions of observation. This is why a typical gyroscope tends to dispose its axis parallel to the earth's in an effort to achieve overall dynamic equilibrium within the total environment. All angular motion is affected by all other angular motions, at least to some degree and a close examination reveals that everything moving is affected to a certain extent. However, rotating systems of force generate a motion pattern that can be used to magnify this interactive effect and, therefore, reveal the influence of the cosmic environment on these patterns of revolving motion.

When the cosmic influences are analyzed, any and all of the motions of anything and everything include some factor of angular displacement. A perfectly straight line is only a concept with respect to a mathematical idea. In reality, nothing moves in absolutely linear displacements, to one degree or another, there is typically an angular component to all motions. Even the primarily linear trajectories associated with electromagnetic radiation are slightly curved and this phenomenon can be readily observed in the vast stretches of outer space. In many cases, the angular component of motion is negligible for all practical intents and purposes, in other cases, it is the primary force of action, but in no case is it non-existent.

Gravity is the reason: the closer an object is to a strong gravitational force, the greater the amount of angular displacement in the surrounding motions. Astrophysicists account for this influence on the light of far away galaxies and describe the effect as a gravitational lens. Gravity exerts a torque on all matter within its grasp. This is a factor that should be included in relativity's equivalence principle to further qualify otherwise pure linear acceleration. The angular paths of moving bodies create the inevitability of a cosmic torque in the spatial frame of any gravitational mass.

The Coriolis Effect is a composite result of the force of gravity in association with the rotating circular path of any given rotating system. As it is ordinarily viewed, the effect on large-scale motions on the surface of any revolving sphere is with respect to linear latitude until reaching a minimum at the poles. A critical examination will show that the angular component of motion is the same everywhere on the planet. Only the angle, with respect to the direction of the force of gravity, changes from the equator to the poles. At the equator, the radius, with respect to the axis of rotation, is greatest; this maximizes the effect on linear motions and is used to advantage when launching rockets into orbit around a sphere.

This bending of motion associated with gravity is the fundamental requirement to achieve a universe that behaves as if having purely linear forces on all but the largest scale of cosmic proportions. All straight lines of motion are ultimately elliptical curves. Accordingly, without an improved understanding of the forces associated with spinning masses and the influence of the gravitational field that is associated with movement of objects in general, it will be impossible to create devices that maximize the use of spinning masses and rotational energy to create linear motion. This means that any device which attempts to harness the kinetic energy and possible advantages based on these principles will continue to be sub-optimal.

SUMMARY OF THE INVENTION

Disclosed is a combination of six substantially identical interconnected rotating masses, with a pair each of the rotating masses being configured to rotate in one of each of the three planes (X, Y, and Z). Regardless of the orientation of the six masses, each pair of the six interconnected rotating masses may share substantially the same center of gravity and generate a separate yet interactive kinetic energy and angular momentum in each of the three planes, thereby providing resistance to rotational forces from external sources. This is known as "equal force presence. In one embodiment, the rotating masses are ring-like masses. In alternative embodiment, the rotating masses are solid masses, similar to flywheels.

BRIEF DESCRIPTION OF THE DRAWINGS

The preferred embodiments of the present invention will hereinafter be described in conjunction with the appended drawings, wherein like designations denote like elements, and.

DETAILED DESCRIPTION OF THE INVENTION

To use the principles of rotational energy and momentum as a mechanism of action, a device or machine needs to be created that embodies the application of the rotational energy and momentum. Accordingly, at least one preferred embodiment of the present invention uses a brushless electric motor design built to spin a magnetically patterned ring like the rotor of a gyroscope to provide the desired mechanism for exploitation of the principles of angular energy and angular momentum in a gravitational field. One preferred embodiment of the present invention employs six of these motors, positioned in parallel pairs, with each pair of motors being positioned at right angles to the other pairs to achieve stability in a specific frame of reference.

Ring geometry of individual spinning masses is the basis to allow for the required association of six of these masses that are equal in their production of angular momentum and kinetic energy at the same angular velocities. The result of this association will allow for the mechanical control of the net rotational inertia of the revolving mass by the control of the individual rotating masses. These individual rotating ring masses are placed in pairs at 90-degree angles with respect to each other pair so that each pair of ring masses will have force that affects the other rotating ring masses identically. The composite revolving mass will exhibit rotational inertia far in excess of the rotational inertia attributed to the mass when not in this precise motion association. This mechanically induced force of rotational inertia will manifest itself as a force to oppose the gravitational field surrounding the composite revolving mass when it reaches the threshold magnitude for the gravitational environment of its then current placement.

The mechanism used for the demonstration of this principle is based on a brushless electrical motor designed to produce large amounts of angular momentum in proportion to the mass of the motor. Six brushless motors of ring geometry are used to create the composite motor. Each of the six brushless motors is designed to produce the same amount of angular momentum and kinetic energy at the same angular velocity. This is accomplished by matching the material used to construct the rotor portion of the brushless motors.

These brushless motors are designed to be powerful gyroscopic actuators producing large amounts of stabilizing rotational force. Each individual ring rotor is a ring-like mass housed within a containment ring. The containment ring is used to contain and control the mechanical spin of the ring rotor and is also the housing for the electrical drive coils for the brushless motors. In general, it is desirable that the ring rotor be engineered to be as heavy and massive as possible and that the containment ring be as light and of minimal mass as is possible while structurally rigid enough to maintain the containment of the moving rotor. The ring rotor rides on the inside surfaces of the containment ring and is supported by a series of bearings and is driven around by a series of drive coils acting on permanent magnets mounted in the rotor. In the most preferred embodiment of the present invention, a series of 6 sets of bearings is driven around by 4 drive coils acting on 6 permanent magnets mounted in the body of the rotor.

Those skilled in the art will recognize that more or fewer bearings may be used in this embodiment without substantially altering the fundamental concepts. Similarly, more or fewer drive coils acting on magnets may be used without departing from the spirit and scope of the present invention. Additionally, the use of magnetic technology may also be employed to obviate the need for brushless motors. For example, the magnetic technology used in maglev train systems may be adapted for use in creating the gyroscopic ring rotors of the present invention.

The apparatus is fundamentally an engine that includes six separate rotatable gyroscopic ring rotors, where each of the six gyroscopic ring rotors is paired with another ring rotor and each pair lies in a separate and distinct plane. In at least one preferred embodiment of the present invention, where each of the three planes (X, Y, and Z) is perpendicular to the other two planes. Each pair of the gyroscopic ring rotors is capable of achieving substantially the same angular momentum at substantially the same angular velocity, as is each of the other two pairs of gyroscopic ring rotors. By simultaneously spinning each of the six gyroscopic ring rotors, the composite superstructure comprised of the six individual ring rotors resists rotation in any single direction. This is known as "equal force presence."

Further, when the rate of rotation for the six spinning ring rotors reaches the appropriate level, the composite structure of the six associated rings resists any change in orientation from any external force, including the gravitational field of the earth or other bodies large enough to generate a significant gravitational field. Accordingly, as the earth spins about its axis, the mechanism moves in the only direction possible, which is up, or away from the center of mass for the body exerting the gravitational force. By adjusting the angular momentum of each of the rings relative to the other rings, or by adjusting the relative angle between the planes of rotation, altitudinal and directional changes of the apparatus can be achieved. Each of the six gyroscopic ring rotors housed within a containment ring may be called a "gyro actuator."

The stabilizing force exerted by each gyro actuator is positioned against the forces exerted by the associated gyro actuators, so that a motion feedback loop is created. This composite superstructure of angular momentum will exhibit a resistance to any force of torque from any direction, making for what can be called "super-additive rotational inertia." The rotational inertia of this composite superstructure is related to the angular momentums of the individual gyro actuators. As long as the forces of the individual rotors are correctly matched and balanced against one another, an internal force of stabilization or equal force presence can be achieved. With a high enough level of angular momentum, this internal force will exceed any influence of external force in the surrounding environment; including the rotational torque associated with the force of gravity in a given gravitational field. Obviously, the greater the gravitational field, the greater the kinetic energy and angular momentum that will be required to overcome the gravitational forces associated with a given environment.

Since it is desirable to maximize angular momentum with respect to mass, the suspension system housing and containing the ring rotor, and acting as an electric stator magnetically inducing the revolving motion of the rotor, is constructed to be as lightweight as possible. The angular acceleration of the ring does not need to be more than the necessary amount to increase angular velocity and momentum and, eventually, reach the desired level. This rate of increase can be gradual, and time can be given for this force to accumulate.

The energy put into the system is converted into the kinetic energy of rotation, minus any loss of energy as heat due to frictional resistance. The amount of energy that can be stored within the system without large losses due to the frictional resistance of rotation and precessional motion depends at least in part on the perfection of the gyro design and construction. If sufficiently perfect, the generation of tremendous amounts of kinetic energy can be accumulated in the form of angular momentum. The degree of the precision of the perfection of this component, thereby minimizing frictional resistance, is a factor in determining its efficiency and effectiveness as a gyro actuator.

If the angular momentum is sufficient, and the containment and suspension system is sufficiently lightweight and free to move, only being anchored at one point to prevent the backspin of this containment ring, each rotor ring will carry the containment ring with it, duplicating any of its secondary angular displacement. And, like a heavy pendulum or a gyro compass, it will maintain its cosmic orientation in space adjusting to a point of maximum stability until harmony with the spinning earth and the cosmic environment is achieved. The final orientation of a free and unrestrained spinning ring gyro is with its axis of rotation approximately parallel to the earth's axis except that it will be spinning in the opposite or complementary direction.

The velocity of rotation and the rotational inertia are the factors that determine the magnitude of the force of the angular momentum of the ring rotor and can be calculated, after accounting for factors such as friction and the inertia of the containment ring as retarding factors of generated force, which will negatively impact the overall performance of the system.

The spin of a ring with minimum frictional resistance to rotation, once stabilized with respect to gravity, if free to move in any direction, will, at a rate proportional to its ratio of angular momentum with respect to mass, continue to adjust with respect to the environment until the point of maximum stabilization is reached on a continuing basis. This position of maximum stabilization is oriented so that the axis of the spinning gyro is approximately parallel to the axis of the spinning earth, yet spinning in the opposite or complementary direction. Thus, the action of a ring gyro actuator with sufficient magnitude of angular momentum will exhibit a predilection to orient itself into a definitive position with respect to the cosmic environment in order to attain optimum stabilization with a substantial force.

With the existence of these individual gyroscope actuators, the primary component exists from which a gyroscope superstructure can be built. In one preferred embodiment of the present invention, each pair of masses takes the form of containment rings fixed in the superstructure, at ninety degree angles to one another, and are locked into place with respect to each other, roughly forming a cube shaped device in which the forces of action on the containment rings are distributed around the periphery of the superstructure in substantially equal and symmetrical manner with respect to the effects of the associated revolving forces.

This superstructure may then be placed in a final light, hollow, and thin, yet strong container. This composite structure will resist torque from any and all directions equally, so long as the individual forces of each component mass are equal and balanced with respect to one another. The increase in the force of angular momentum of each individual component increases the resistance of the superstructure to any outside torque, including the overall frame of gravitational forces associated with the earth and other masses. The composite superstructure of gyroscope actuators exhibits the super-additive force of maximum rotational inertia.

Knowing that the composite superstructure will resist torque from any direction is only one consideration of the result of this composite motion. The pairs of gyroscopes, placed in an orientation such that each pair is offset by ninety degrees to one another in a composite superstructure, cannot all be simultaneously in maximum equilibrium with respect to any cosmic environment that is held by the force of gravity, in an angular revolution, as is the case on the surface of a planet like the earth. When in such an environment, each of the three pairs of gyros will continue to exert their individual influences of action toward maximum stabilization, but all the while the composite superstructure will not be able to absorb any precessional adjustments. Any pair of gyro actuators, by precessing to adjust to the force of torque will, of necessity, cause the other two pairs of gyro actuators to require this same adjustment, doubling the problem within the composite system, thus creating a motion feedback loop that has no resolution within the system.

Only by being insulated by sufficient distance from the influence of gravity in the cosmic environment will the composite superstructure of interlocked gyroscopes find equilibrium. The superior resistance to torque will direct this system of motion to the environment, which is the freest from torque exerted by the gravitational forces inherent in a typical gravitational field. The degree of the magnitude of this composite force of resistance to torque is mechanically connected to, and dependent on, the individual force of each component gyroscope. Gravity is overcome when enough energy is generated by the system that the resistance to torque reaches a threshold resulting in a force of displacement in the direction where least external force, manifesting as torque, exists. This direction is generally away from any and all gravitational sources, including planets and other bodies of mass located within the universe.

The mass, shape, and speed of rotation are factors in the measurement of angular momentum, but shape and mass are the most significant factors in determining rotational inertia. This is true except in the special circumstance when the mass is spinning and angular momentum itself resists any secondary force of torque or tumble against the primary angle of rotation. Any secondary tumbling force is distributed about the periphery of the spinning object as precessional motion that will slow the primary velocity of rotation until a final balance of a single axis of rotation is achieved. This super-additive effect of increased rotational inertia of the mass in every direction except the one of primary rotation underscores the fact that an object rotating resists tumbling; there can be only one axis of rotation.

Figure 1:
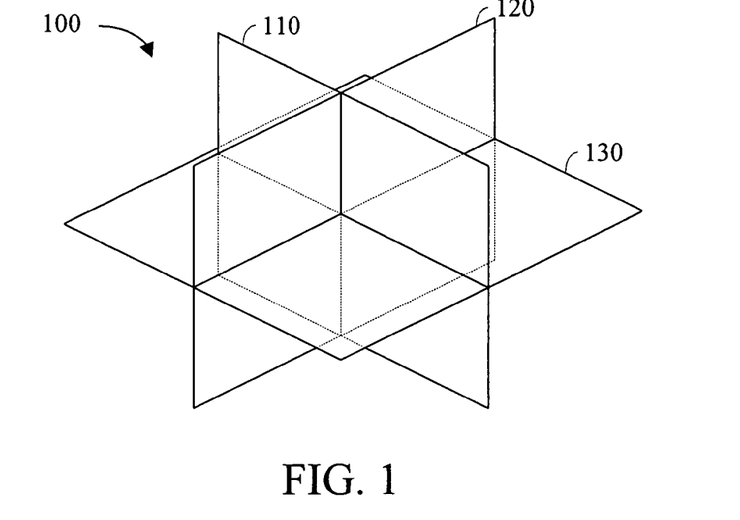
FIG. 1 is a perspective view of the three planes for initial rotation of the six gyroscopic rings of a gyroscopic propulsion apparatus according to a preferred embodiment of the present invention.

Referring now to FIG. 1, the three different planes of initial rotation for a gyroscopic propulsion apparatus according to a preferred embodiment of the present invention are shown. As shown in FIG. 1, a first plane 110 is perpendicular to a second plane 120 and to a third plane 130. Similarly, second plane 120 is perpendicular to third plane 130. Thus, each of the three planes of rotation is perpendicular to the other two planes of rotation. For the purposes of the present invention, each of the three pairs of gyroscopes will coordinate as a pair to provide a composite ring-like rotating mass in one of each of these planes.

Figure 2:
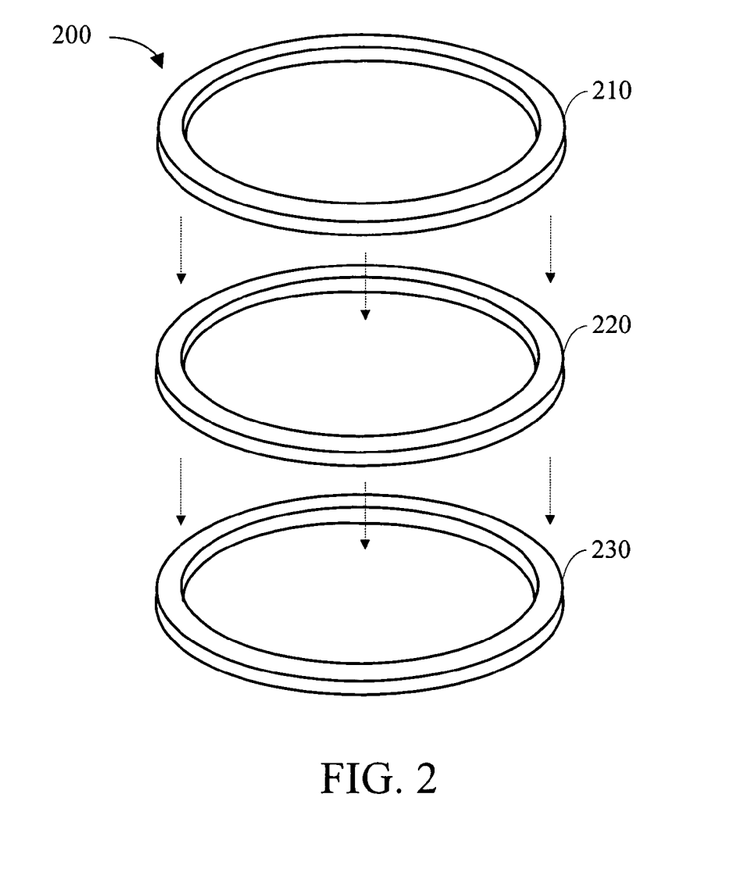
FIG. 2 is an exploded view of the three main components in a single gyroscopic ring used in a gyroscopic propulsion apparatus in accordance with a preferred embodiment of the present invention.

Referring now to FIG. 2, an exploded view of the basic components of a gyroscopic ring 200 in accordance with a preferred embodiment of the present invention is shown. As shown in FIG. 2, gyroscopic ring 200 includes an upper half-shell 210, a rotor element 220, and a lower half-shell 230. Upper half-shell 210 and lower half-shell 230 form a container for rotor element 220 and are most preferably constructed from a high-strength, durable, non-metallic, lightweight material such as Vespel® made by Dupont®. Upper half-shell 210 and lower half-shell 230 are ring-shaped shell elements which are joined together and form a containment ring or housing for rotor element 220. Rotor element 220 is a spinning ring-shaped mass and is most preferably constructed from durable metals such as titanium, stainless steel, etc. The specific design of the internal surfaces of the upper half-shell 210 and lower half-shell 230 are described in greater detail in FIG. 20.

Rotor 220 is carefully machined such that the inner and outer diameter of rotor 220 is slightly smaller than the inner diameter of upper half-shell 210 and lower half-shell 230. Additionally, the overall thickness of rotor 220 is slightly less than the interior space provided within the housing formed by upper half-shell 210 and lower half-shell 230. This allows rotor 220 to rotate rapidly yet freely within the housing formed by the union of upper half-shell 210 and lower half-shell 230. Since rotor 220 will be rotating or spinning at a high rate, it is desired that all of the components be durable and of high-quality workmanship. Further detail regarding the manufacture of rotor 220, upper half-shell 210, and lower half-shell 230 is described in conjunction with FIG. 5.

Figure 3:
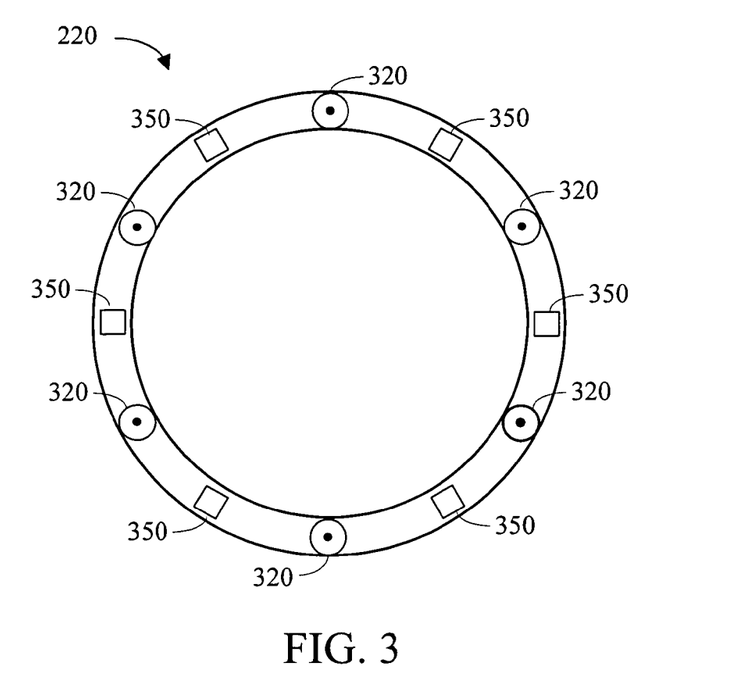
FIG. 3 is a plan view of the surface of the rotor for one of the gyroscopic rings of a gyroscopic propulsion apparatus in accordance with a preferred embodiment of the present invention.
Figure 4:
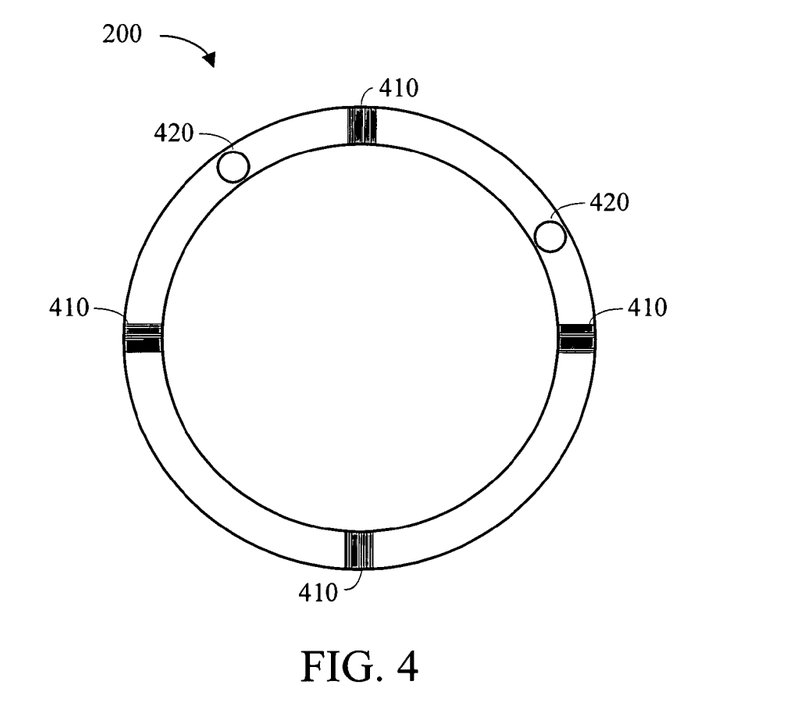
FIG. 4 is a plan view of an external housing for the rotor of the ring of FIG. 3.

Referring now to FIGS. 3 and 4, a representative gyroscopic ring 200 is shown. In order to construct a gyroscopic propulsion apparatus or unit in accordance with at least one preferred embodiments of the present invention, six gyroscopic rings 200 will be needed, with each of the six rings having the same density. FIG. 3 depicts the general physical nature of the various components of a representative rotor element 220 of a representative gyroscopic ring 200 and FIG. 4 depicts the exterior housing of a representative gyroscopic ring 200 with a series of copper windings 410. In the preferred embodiments of the present invention, gyroscopic ring 220 serves as the rotor of a brushless motor. Rotor element 220 includes a series of bearings 320 and a series of magnets 350.

As shown in FIG. 3, each set of bearings 320 are spaced equidistant around the circumference of gyroscopic ring 220. Similarly, magnets 350 are also spaced equidistant around the circumference of gyroscopic ring 220. In the preferred embodiments of the present invention, there are an equal number of bearings 320 and magnets 350 embedded into the body of gyroscopic ring 220. In the most preferred embodiment of the present invention, the number of bearings 320 is six and the number of magnets 350 is also six.

Magnets 350 are embedded into the body of rotor element 220 so as to interoperate with copper windings 410 and create the drive mechanism for the brushless motor that propels rotor element 220 within the housing of gyroscopic ring 200. Magnets 350 are neo-dimium ferrous boron magnets. Magnets 350 are high-grade magnets generating a magnetic force of approximately 4,800 gauss each. Magnets 350 are electrically connected in sets, with each set being connected in parallel.

Bearings 320 are recessed into the body of rotor element 220 and serve to minimize the amount of surface contact area between rotor element 220 and the housing of gyroscopic ring 200. In the most preferred embodiments of the present invention, bearings 320 are high-grade gyro bearings manufactured from non-magnetic stainless steel. This allows rotor element 220 to rotate rapidly with the housing of gyroscopic ring 200 with a minimal amount of loss due to friction. Bearings 320 are most preferably constructed from high quality stainless steel and to be as resistive to friction as possible.

In at least one preferred embodiment of the present invention, the six rings are associated such that each pair of the six rings is capable of being positioned at 90° relative to the other two pairs of rings. In another preferred embodiment of the present invention, the six rings are capable of rotating around an axis and being repositioned relative to the other rings Referring now to FIG. 4, a plan view depicting the exterior of a representative gyroscopic ring 200 according to a preferred embodiment of the present invention is shown. The exterior includes copper windings 410 and Hall Effect sensors 420. In at least one preferred embodiment of the present invention, the number of copper windings 410 is four. Each of the four copper windings 410 is a comprised of a series of windings of copper wire made around the body of gyroscopic ring 200 at points spaced 90° apart. Copper windings 410 cooperate with magnets 350 to provide the propulsion for rotor element 220 within the housing of gyroscopic ring 200 in a manner consistent with typical operation of a brushless motor. Additionally, copper windings 410 serve to hold upper half-shell 210 and lower half-shell 230 together.

In at least one preferred embodiment of the present invention, each copper winding 410 is made using "turns" of approximately 28 gauge copper wire. In this embodiment of the present invention, each copper winding 410 is approximately 1.25 inches for each layer of copper winding 410. Approximately 14 layers of copper are wound around the body of gyroscopic ring 200. It is desirable to keep the weight of copper windings 410 to a minimum yet have enough copper to create thrust sufficient to efficiently spin rotor element 220 within the body created by upper half-shell 210 and lower half-shell 230.

Copper windings 410 operate in pairs for a single circuit and each of a pair of copper windings 410 that are located opposite each other form a single circuit. Accordingly, there are two circuits for the arrangement shown in FIG. 4. Additionally, each of the pairs of copper windings 410 for each of the two circuits operates in conjunction with a single Hall Effect sensor 420 to determine the location of magnets 350, thereby allowing the effective operation of the brushless motor.

Hall Effect sensors 420 are used to sense the position of magnets 350 as part of a feedback loop, which is used to control the rate of angular velocity for the gyroscopic rings. The use of Hall Effect sensors 420 in the overall control of the circuit is explained in greater detail in conjunction with FIG. 8. Connected to copper windings 410 and Hall Effect sensors 420 are a set of control wires. The control wires provide a means for transmitting control signals to and from superstructure 700 in order to cause the rotors for each of the ring-like gyroscopes to rotate.

Figure 5:
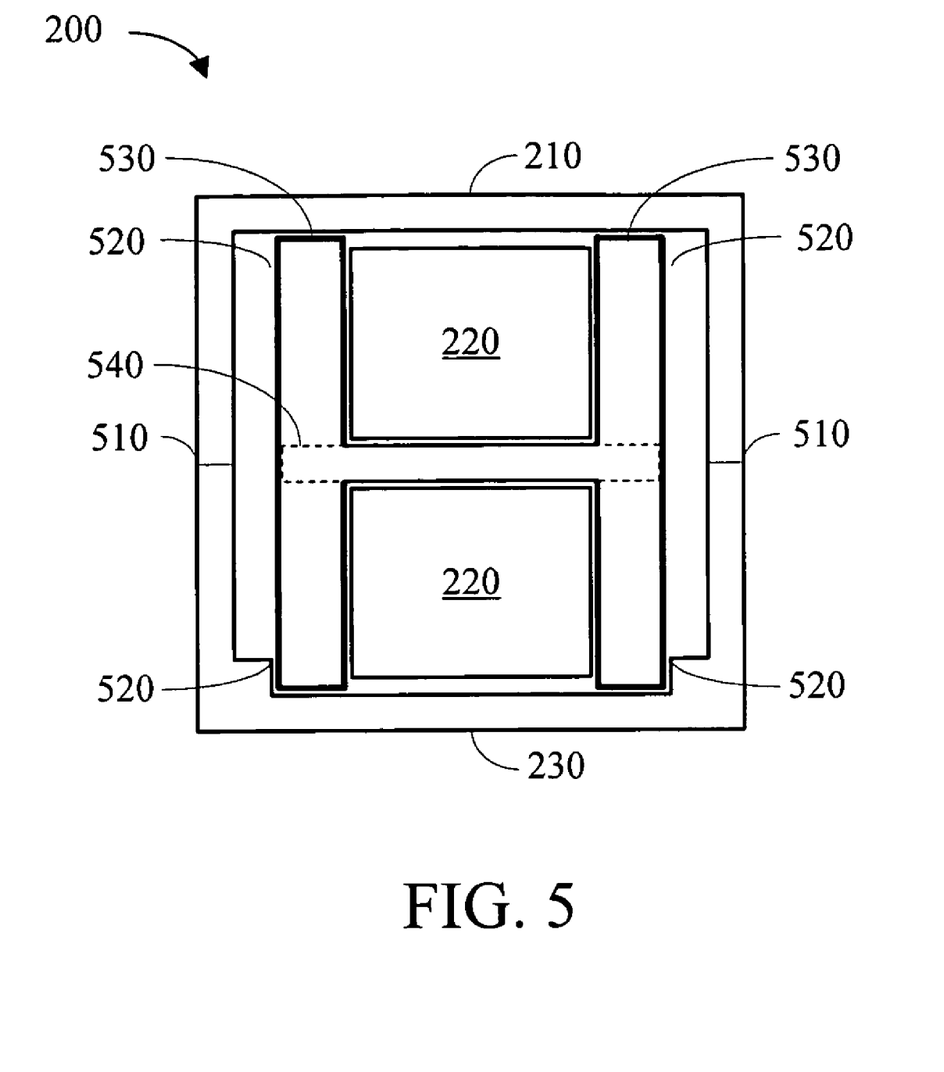
FIG. 5 is a sectional view of a portion of the bearing assembly of the rotor portion of the gyroscopic ring of FIG. 3.

Referring now to FIG. 5, a cross-sectional view of the interior of a representative gyroscopic ring 200 is shown. The housing of gyroscopic ring 200 is comprised of upper half-shell 210 and lower half-shell 230, joined at seam 510. A series of interior step portions 520 serve to contain the lateral movement of rotor element 220 within the housing of gyroscopic ring 200 as it rotates about its axis of rotation. Similarly, upper half-shell 210 and lower half-shell 230 cooperate to constrain the vertical movement of rotor element 220 within the housing of gyroscopic ring 200 as it rotates about its axis of rotation. Each bearing 320 comprises a pair of wheels 530 joined together by an axle 540. Axle 540 is inserted through an opening formed in the body of rotor element 220. The diameter of wheels 530 is slightly larger than the thickness of rotor element 220, thereby preventing rotor element 220 from contacting the housing of gyroscopic ring 200 as it rotates about its axis of rotation. When fixed in place, bearings wheels 530 are the only point of contact with the housing of gyroscopic ring 200 as rotor element 220 rotates about its axis of rotation.

Figure 6:
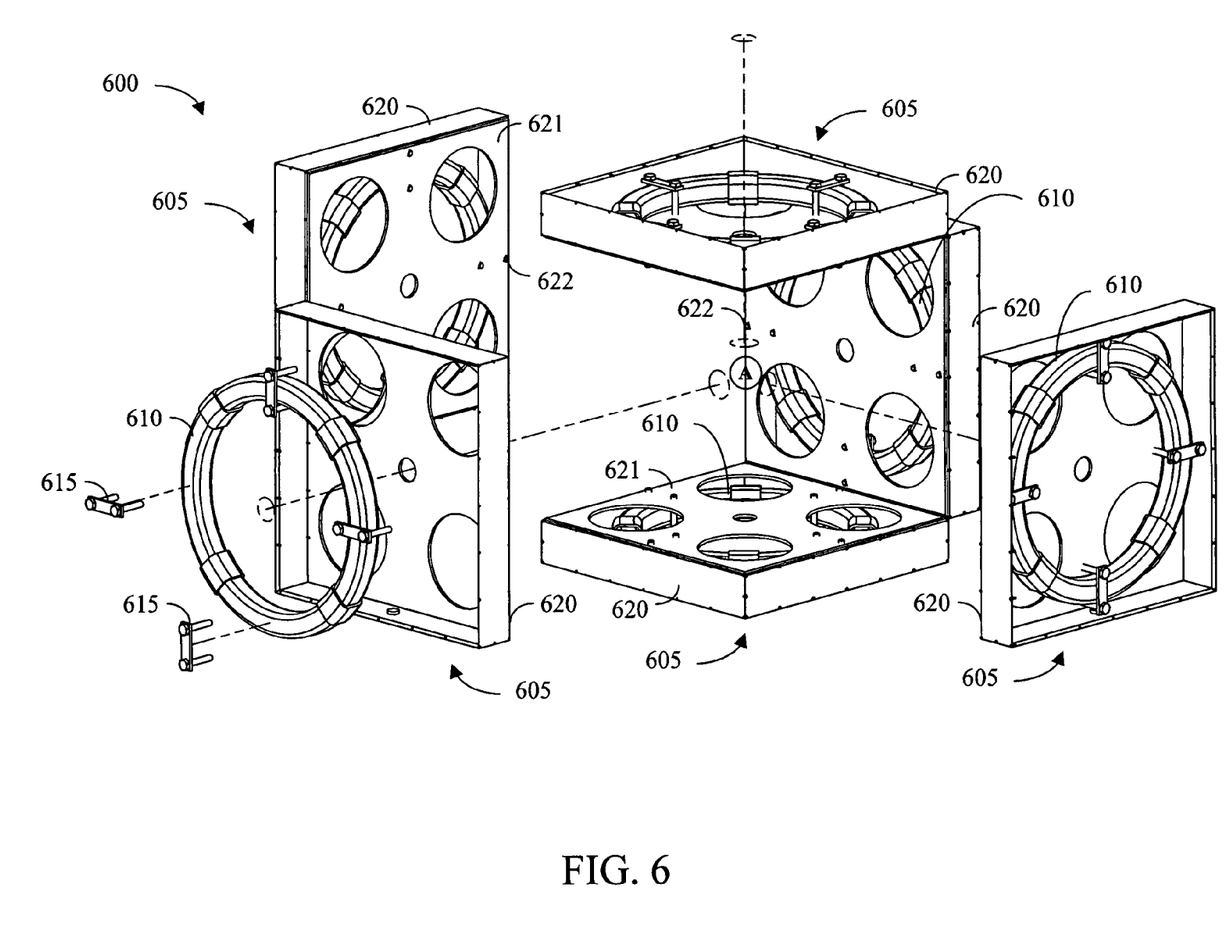
FIG. 6 is an exploded view of a gyroscopic propulsion unit in accordance with a preferred embodiment of the present invention.

Referring now to FIG. 6, an exploded view of a gyroscopic propulsion unit 600 in accordance with a preferred embodiment of the present invention is shown. Gyroscopic propulsion unit 600 comprises six gyroscopic rings 610 mounted in six ring frames 620 by a plurality of fasteners 615. Fasteners 615 are used to hold gyroscopic rings 610 firmly affixed to a mounting plate 621 for each ring frame 620. In at least one preferred embodiment of the present invention, fasteners 615 comprise screws or bolts.

In the most preferred embodiments of the present invention, each gyroscopic ring 610 is substantially the same size and weight and is manufactured from the same materials. Ring frames 620, fasteners 615, and other components of gyroscopic propulsion unit 600 are most preferably manufactured from the most lightweight suitable materials possible. Since gyroscopic propulsion unit 600 is designed to provide propulsion, the overall weight of gyroscopic propulsion unit 600 should be minimized to the extent practical while still achieving equal force presence.

In the most preferred embodiments of the present invention, ring frames 620 are manufactured from a lightweight rigid material such as heavy-duty plastics or ceramics. The material should be relatively resistant to the effects of heat. One such material is Vespel® manufactured by Dupont®. One of the goals in the design of gyroscopic propulsion unit 600 is to maximize the mass of the rotating masses relative to the weight of the other components of gyroscopic propulsion unit 600.

Once assembled, each ring frame 620 will house a gyroscopic ring 610 and when all ring frames 620 are fastened to each other, the resulting apparatus will resemble a cube. It should be noted that a center point "A" will be a center point for each of the six gyroscopic rings 610, no matter the orientation of gyroscopic rings 610.

In the most preferred embodiments of the present invention, gyroscopic propulsion unit 600 is housed in a housing constructed of a durable, non-metallic material such as high-strength plastic or some other similar material. Additionally, the housing may contain optional apertures that allow heat to escape the interior of the housing. Given that the rotors contained with gyroscopic propulsion unit 600 may be spinning rapidly, thereby generating heat, it is desirable to provide a way for the heat generated by the spinning masses to escape the interior of the housing. Accordingly, as shown in FIG. 6, ventilation openings may be present in ring frames 620 as well.

Gyroscopic propulsion unit 600 may be fixed in position within the interior of the housing by using a series of molded posts, containment ridges, or other means sufficient to contain gyroscopic propulsion unit 600 in place within the interior of the housing. Once placed within the housing, one or more gyroscopic propulsion device can be attached to other objects and the propulsion generated by one or more gyroscopic propulsion devices 600 can be used to transport objects from one place to another. This would allow the gyroscopic propulsion device(s) 600 to be used as a propulsion apparatus or engine for a vehicle in applications such as transporting people and shipping goods from place to place.

In order to achieve propulsion using gyroscopic propulsion unit 600, each gyroscopic ring 610 is energized by the combination of their respective magnets and windings to start the rotor element contained within each respective gyroscopic ring spinning. The actual length of time required to "spin up" the rings is not as important as the gyroscopic rings achieving the same angular velocity and the same angular momentum. In addition, as long as the masses housed within the gyroscopic rings are spinning at the same angular velocity, each of the gyroscopic rings will also maintain an equal kinetic energy. This equates to equal "force presence."

Depending on the circumference of the gyroscopic rings, the mass of the respective rotor elements, and the angular velocity of the gyroscopic rings, gyroscopic propulsion unit 600 will reach a point of internal stabilization that will resist all outside forces, including the force of gravity. At this point, any increase in the angular velocity of the gyroscopic rings causes gyroscopic propulsion unit 600 to resist the rotational torque of the earth and seek an internal equilibrium that cannot be reached in its present location with respect to the gravitational field of the earth, or other body of mass large enough to create any type of significant gravitational field. Accordingly, gyroscopic propulsion unit 600 will need to move to a new location where the forces of internal stabilization can be maintained. This will cause gyroscopic propulsion unit 600 to move away from the earth (or other significant mass) to a distance where the internal stabilization of gyroscopic propulsion unit 600 can be maintained. The distance moved will be related to the angular momentum of the spinning masses.

The greater the angular momentum of the spinning masses, the greater the distance gyroscopic propulsion unit 600 will need to move. Similarly, by reducing the angular velocity of the rings, gyroscopic propulsion unit 600 will begin to move back towards the earth because the internal stabilization can be maintained within a smaller distance.

Similarly, movement in directions other than directly away from the earth can be achieved by varying the angular velocity of one or more of the gyroscopic rings to create an imbalance in the angular velocities of the gyroscopic rings and/or by changing the orientation of the gyroscopic rings with respect to one another.

Figure 7:
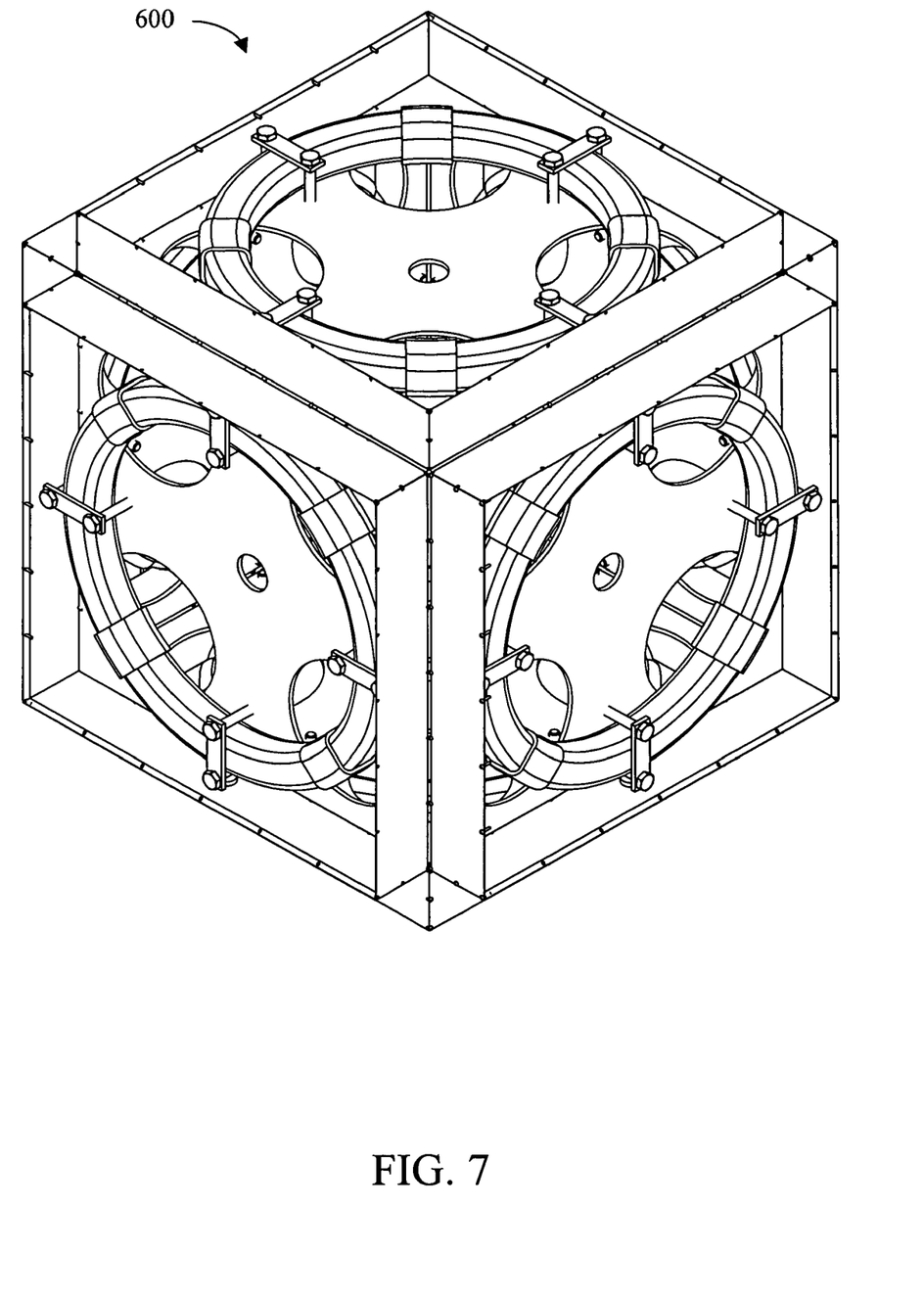
FIG. 7 is a perspective view of the gyroscopic propulsion unit of FIG. 6 when fully assembled.

Referring now to FIG. 7, a fully assembled gyroscopic propulsion unit 600 is depicted. It should be noted that gyroscopic propulsion unit 600 is connected to a computer control system (not shown this FIG.), such as the one depicted in FIG. 11 below.

In addition to the gyroscopic propulsion unit described in FIG. 6 and FIG. 7, a similar yet different gyroscopic propulsion unit can be created by using a series of magnetically driven flywheels acting as gyroscopic motors or actuators to achieve equal force presence. Similar to the gyroscopic propulsion unit described in FIG. 6 and FIG. 7, six flywheels are arranged in pairs with one pair fixed to rotate in each of three planes and at right angles to each of the other pairs of flywheels. This preferred embodiment of the present invention has certain advantages in manufacturing and assembly that make it well suited for certain application.

In this configuration, the individual motor assemblies each have an axle extending from a hub in each of the six directions making them perpendicular to each surface on the resulting cube-like gyroscopic propulsion unit. The axle comes through the center of a back-plate where the back-plate is placed at substantially the same distance from the center hub in each case mounted on the axle with a stop or c-ring on the axle. The back-plates have four side border-plates or flanges used to support the face-plate and therefore containing each of the motor assemblies.

There is an inner-spacer between the back-plate and the bearing component of the rotor preventing any contact with the back-plate and the rotor. Another outer-spacer is placed on the axle on the other side of the flywheel and then another c-clip holding the flywheel and spacers in place. A face-plate is placed over the flywheel and spacers with the axle extending through the face-plate so that the face-plate rests on the side borders plates. The back-plate, side border plates, and the face plates are all held in association by screws and completely contain the flywheel and motor drive components and keeping the flywheel from making contact with any surface.

The motor drive components consist of four electromagnets positioned in each corner of the assembly containment boxes that act as a motor coil assembly. Additionally, a Hall Effect sensor is positioned on one of the side-plates between the electromagnets. The flywheel component of the rotor has four powerful permanent magnets (neodymium or other similar suitable material) mounted and embedded equidistant from each other at the periphery of the flywheel and being positioned at ninety degree angles with respect to one another. The magnets are placed so that the electromagnetic coils can alternately pull and push each magnet causing the flywheel to rotate when triggered by the electrical induction of the drive circuit. The Hall Effect sensor associated with a dedicated circuit is used to determine or sense the location of the magnets embedded in the flywheel. A control circuit is used to coordinate the sensing circuit with the drive circuit to control the angular acceleration of the rotor. A computer control circuit, such as that discussed below in conjunction with FIG. 11, coordinates all six of the motor circuits to operate the composite cube device.

Figure 8:
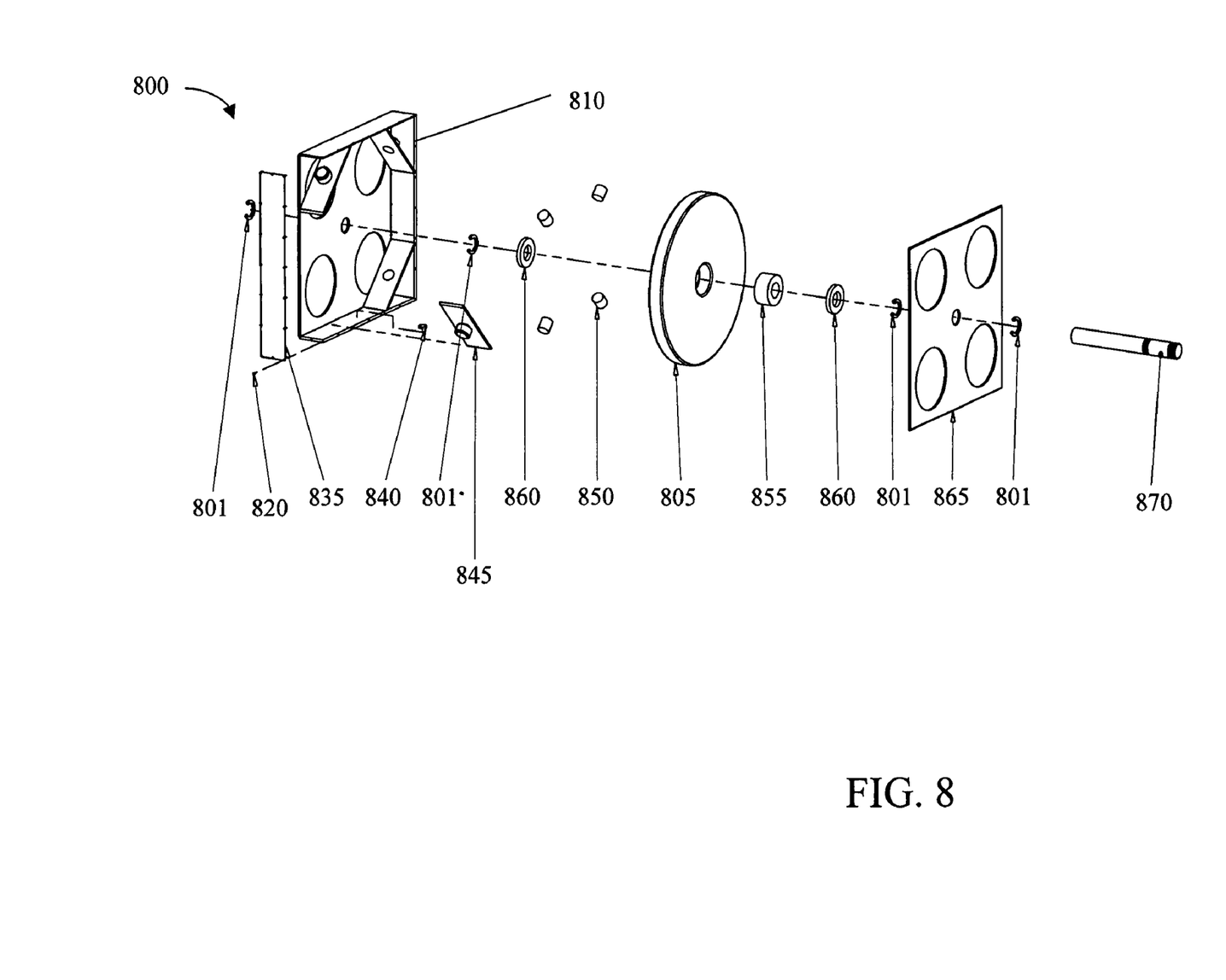
FIG. 8 is an exploded view of a gyroscopic propulsion unit in accordance with an alternative preferred embodiment of the present invention.

Referring now to FIG. 8, an exploded view of a gyroscopic motor 800 in accordance with an alternative preferred embodiment of the present invention is shown. As shown in FIG. 8, instead of using a plurality of rotating rings, gyroscopic motor 800 employs six solid body masses, similar to a flywheel. This configuration has several advantages over the ring design. First, it is simpler to construct, assemble and operate. Additionally, the mass of the flywheel can be made larger and can be more densely compacted into a smaller space, allowing for an overall reduction in the size of gyroscopic motor 800.

At the most basic level, gyroscopic motor 800 comprises a flywheel 805 inserted into a frame 810 which comprises four side plates or flanges 835. Flywheel 805 will provide propulsion in much the same manner as previously discussed in conjunction with the rotating rings described in FIG. 6 and FIG. 7.

Flywheel 805 rotates on axle 870 and flywheel 805 is enclosed in frame 810 by faceplate 865. Motor coil assemblies 845 and magnets 850 serve the same purpose as the motor coils previously discussed in conjunction with FIG. 3 and FIG. 4 above. Hall Effect sensors 840 are used to provide the appropriate timing for effecting the rotation of flywheel 805, which is positioned against wheel bearing 855, allowing for the rotation of flywheel 805 within frame 810. C-rings 801 and spacers 860 are provided to stabilize and connect the various components together.

Figure 9:
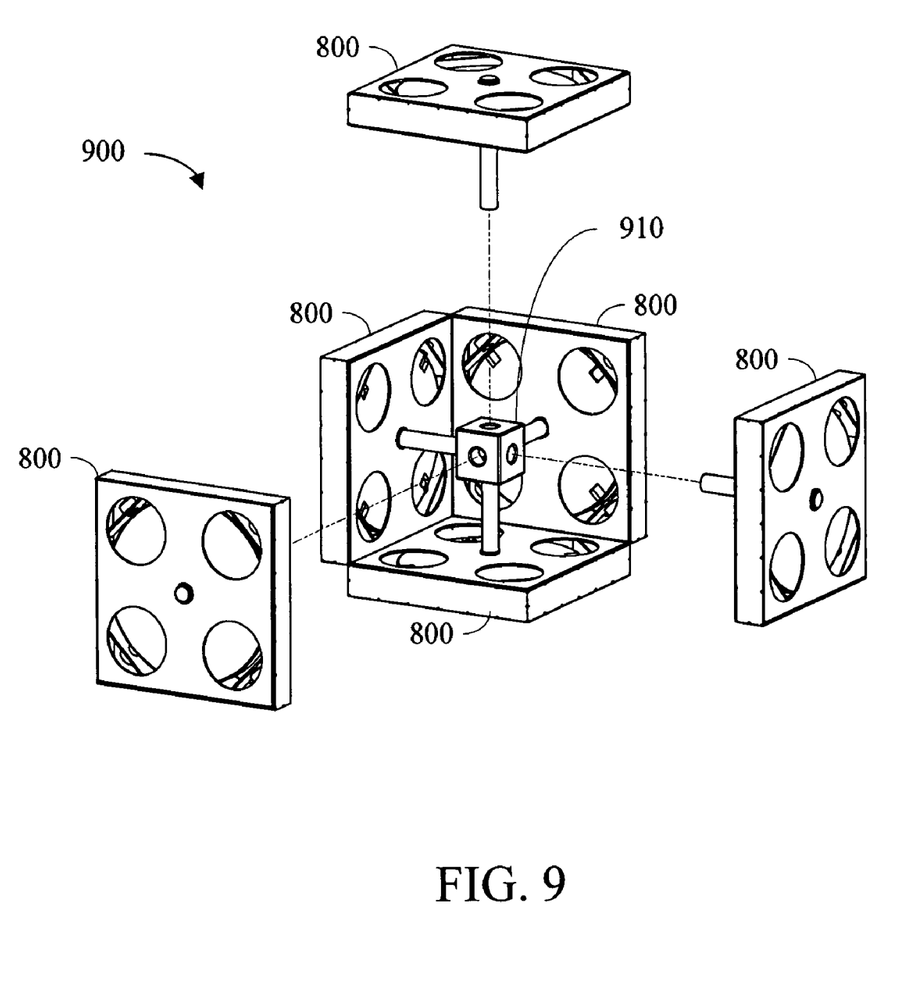
FIG. 9 is an exploded view of a gyroscopic propulsion unit in accordance with an alternative preferred embodiment of the present invention.

Referring now to FIG. 9, an exploded view of a gyroscopic propulsion unit 900, assembled from six gyroscopic motors 800 of FIG. 8 is depicted. As shown in FIG. 9, axle for each gyroscopic motor 800 is inserted into a hub 910 and hub 910 provides a fixation point and support for each axle.

Figure 10:
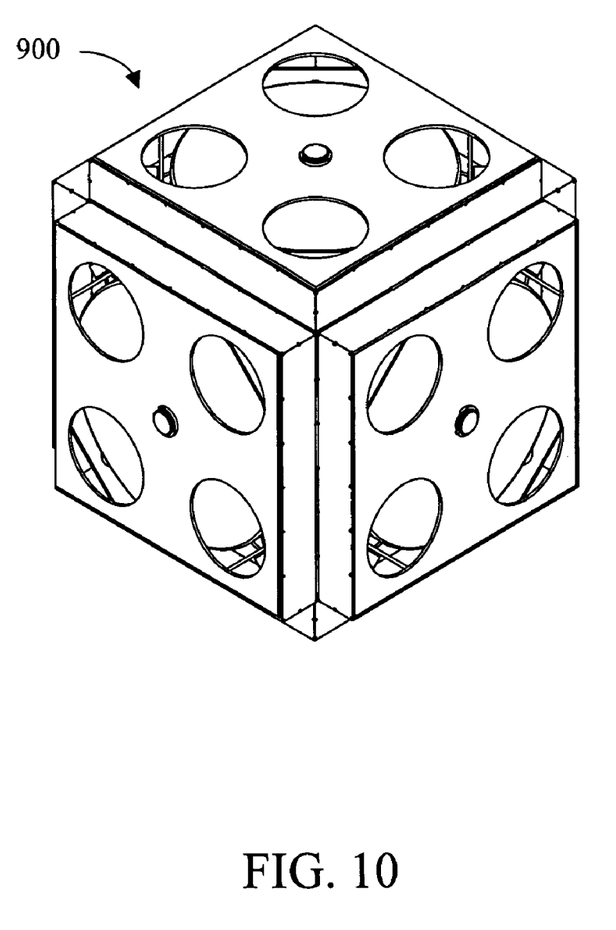
FIG. 10 is a perspective view of the gyroscopic propulsion unit of FIG. 9 when fully assembled.

Referring now to FIG. 10, a fully assembled gyroscopic propulsion unit 900 is depicted. It should be noted that gyroscopic propulsion unit 900 is connected to a computer control system (not shown this FIG.), such as the one depicted in FIG. 11 below. This allows the rotation of each flywheel 805 to be monitored and controlled. As previously discussed in conjunction with the rotating rings above, when the rate of rotation for the six spinning flywheels reaches the appropriate level, the composite structure of the six associated flywheels resists any change in orientation from any external force, including the gravitational field of the earth or other bodies large enough to generate a significant gravitational field.

Accordingly, as the earth spins about its axis, the gyroscopic propulsion unit moves in the only direction possible, which is up, or away from the center of mass for the body exerting the gravitational force. By adjusting the angular momentum of each of the flywheels relative to the other flywheels, altitudinal and directional changes of the gyroscopic propulsion unit can be achieved. Each of the six gyroscopic flywheels housed within a frame may also be called a "gyro actuator."

Figure 11:
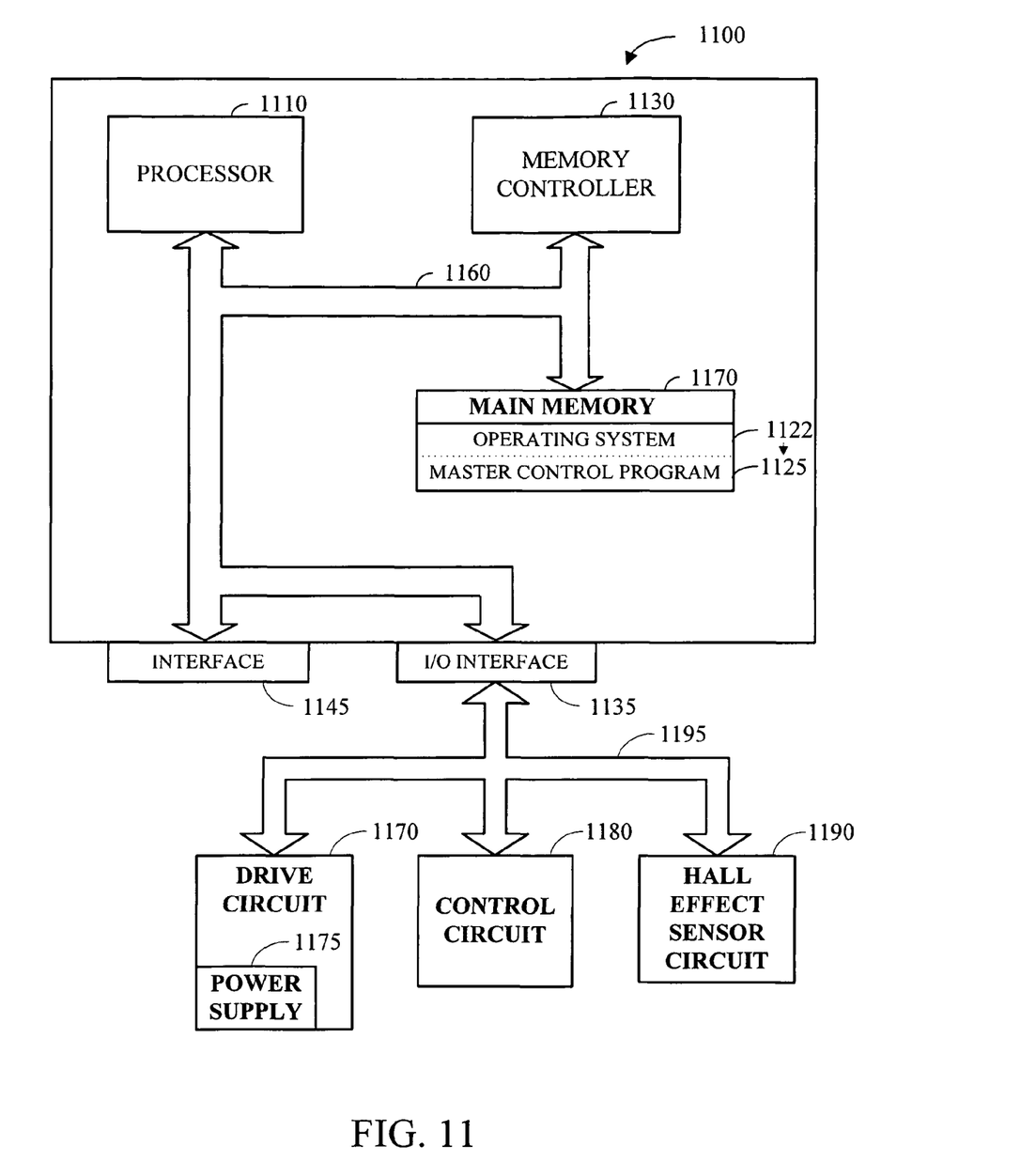
FIG. 11 is a block diagram of the control circuits for a gyroscopic propulsion unit in accordance with a preferred embodiment of the present invention.

Referring now to FIG. 11, a block diagram of a control system 1100 for a gyroscopic propulsion apparatus according to a preferred embodiment of the present invention is shown. The main purpose of control system 1100 is to work with the drive electromagnetic drive components of the gyroscopic propulsion apparatus and thereby control a direction of rotation and a rate of rotation for each of the masses used in the various preferred embodiments of the gyroscopic propulsion units of the present invention.

As shown in FIG. 11, control system 1100 most preferably incorporates a computer 1105; an I/O interface 1135; an interface 1145; a bus 1195; a drive circuit 1170; a control circuit 1180; and a Hall Effect sensor circuit 1190. As those skilled in the art will appreciate, the methods and apparatus of the present invention apply equally to any computer system and combination of circuit components. Specifically, it is envisioned that a hand-held computer or palm-computing device may perform all or substantially all of the functions described in conjunction with computer 1105.

Alternatively, control system 1100 may be implemented with a Field Programmable Gate Array (FPGA), digital control circuitry, or other type of circuit mechanism. Regardless of the specific implementation, it is desirable that there be some mechanism provided whereby the rate of rotation and angular relationship of the three ring-like gyroscopes can be controlled. In some applications, control system 1100 may be contained within the housing and the various control signals necessary to control gyroscopic propulsion units 600 and 900 and may be transmitted to and from control system 1100 from an external source via wireless communication means (e.g., Wi-Fi, IR, etc.).

Computer 1105 suitably comprises at least one Central Processing Unit (CPU) or processor 1110, a main memory 1120, a memory controller 1130, and an I/O interface 1135, all of which are interconnected via a system bus 1160. Note that various modifications, additions, or deletions may be made to control system 1100 and computer 1105 as illustrated in FIG. 11 within the scope of the present invention such as the addition of cache memory or other peripheral devices. For example, computer 1105 may also include a monitor or other display device (not shown) connected to the system bus 1160. Alternatively, it is anticipated that computer 1105 may be a terminal without a CPU that is connected to a network as a network computer (NC). In that case, the responsibilities and functions of CPU 1110 will be assumed and performed by some other device on the network. FIG. 11 is not an exhaustive illustration of any specific control system, computer system or configuration, but is presented to simply illustrate some of the salient features of one preferred embodiment for control system 1100.

Processor 1110 performs the computation and control functions of computer 1105, and may comprise a single integrated circuit, such as a microprocessor, or may comprise any suitable number of integrated circuit devices and/or circuit boards working in cooperation to accomplish the functions of a processor. Processor 1110 typically executes and operates under the control of an operating system 1122 within main memory 1120.

I/O interface 1135 allows computer 1105 to store and retrieve information from drive circuit 1170, control circuit 1180, and Hall Effect sensor circuit 1190 via bus 1195. It is important to note that while the present invention has been (and will continue to be) to include a fully functional computer system, those skilled in the art will appreciate that the various mechanisms of the present invention are capable of being distributed as a program product in a variety of forms, and that the present invention applies equally regardless of the particular type or location of signal to control the apparatus. I/O interface 1135 may be a single bus or multiple computer bus structures. Additionally, I/O interface 1135 may communicate via serial or parallel presentation of the data using any type of communication protocol and physical connection, including RS-232, Universal Serial Bus (USB) or any other standard connection means known or developed by those skilled in the art.

Interface 1145 is a connection interface for connecting keyboards, monitors, trackballs and other types of peripheral devices to computer 1105. Although shown as a single interface, interface 1145 may actually be a combination of interface connections, each with a separate connection to bus 1160.

Memory controller 1130, through use of a processor (not shown) separate from processor 1110, is responsible for moving requested information from main memory 1120 and/or through I/O interface 1135 to processor 1110. While memory controller 1130 is shown as a separate entity, those skilled in the art understand that portions of the function provided by memory controller 1130 may actually reside in the circuitry associated with processor 1110, main memory 1120, and/or I/O interface 1135.

Although computer 1105 depicted in FIG. 11 contains only a single main processor 1110 and a single system bus 1160, it should be understood that the present invention applies equally to computer systems having multiple processors and multiple system buses. Similarly, although the system bus 1160 of the preferred embodiment is a typical hardwired, multi-drop bus, any connection means that supports bi-directional communication in a computer-related environment could be used, including wireless communication means.

Main memory 1120 suitably contains an operating system 1122 and a master control program 1125. The term "memory" as used herein refers to any storage location in the virtual memory space of computer 1105. It should be understood that main memory 1120 would not necessarily contain all parts of all mechanisms shown. For example, portions of operating system 1122 may be loaded into an instruction cache (not shown) for processor 1110 to execute, while other related files may well be stored on magnetic or optical disk storage devices (not shown). In addition, although shown as a single memory structure, it is to be understood that main memory 1120 may consist of multiple disparate memory locations.

Operating system 1122 includes the software, which is used to operate and control computer 1105. Operating system 1122 is typically executed by processor 1110. Operating system 1122 may be a single program or, alternatively, a collection of multiple programs, which act in concert to perform the functions of any typical operating system, which functions are well known to those skilled in the art.

Master control program 1125 is the overall control program for control system 1100. Master control program 1125 communicates with drive circuit 1170, control circuit 1180 and Hall Effect sensor circuit 1190 via bus 1160 and bus 1195. Master control program 1125 is capable of interpreting the various signals received from I/O interface 1135 and translating the signals in order to operate a gyroscopic propulsion apparatus. Master control program 1125 further incorporates a user interface, which allows an operator to send instructions via bus 1195, thereby controlling the operation of a gyroscopic propulsion device. The user may interact with master control program 1125 by use of a video display terminal and keyboard (not shown), which may be connected via interface 1145.

Bus 1195 is any communication path or medium used to transmit signals and provide communication between computer 1105, drive circuit 1170, control circuit 1180 and Hall Effect sensor circuit 1190. This includes standard serial and parallel bus structures, regardless of the physical topology of the communication path or physical medium used. In at least one preferred embodiment of the present invention, bus 1195 is a wireless communication signal.

Drive circuit 1170 contains a power supply 1175 which may be physically connected to coils 410 (in the case of gyroscopic propulsion unit 600) and motor coil assemblies 845 (in the case of gyroscopic propulsion unit 900) and is used to deliver approximately 2-8 amps at 90-180 volts, thereby causing rotors 220 or flywheels 805 to rotate. Those skilled in the art will understand that the operation of drive circuit 1170 to control the rate of rotation for rotors 220 is similar to the operation of a standard brushless motor. Drive circuit 1170 delivers the precise amount of electricity to coils 410 at precisely the right time.

Control circuit 1180 is a timing circuit that is used to calculate the speed of rotors 220 or flywheels 805 and communicates with drive circuit 1170 to control the timing for operating the gyroscopic propulsion apparatus.

Hall Effect sensor circuit 1190 relays information from Hall Effect sensors 420 or 840 and is used to monitor and locate the position of magnets 350 with respect to coils 410 as rotor 220 rotates. The location of magnets 350 is sent to master control program 1125 for additional processing. This allows master control program 1125 to send signals to control circuit 1180 and control circuit 1180 will communicate with drive circuit 1170 which will energize coils 410 in the appropriate sequence at the appropriate time to each drive rotor 220, thereby creating the angular momentum of superstructure 600. While the controls are shown as separate circuits, drive circuit 1170, control circuit 1180, and hall effect sensor circuit 1190 may be combined into a single circuit and integrated with a computer 1105 for certain applications.

Figure 12:
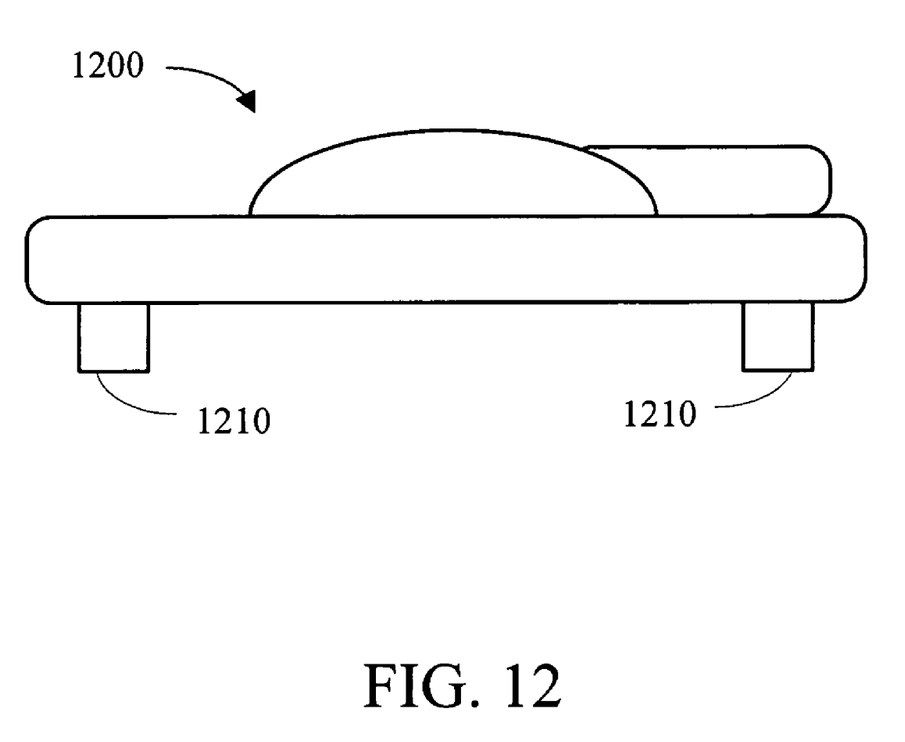
FIG. 12 is a perspective view of a vehicle incorporating a gyroscopic propulsion unit in accordance with a preferred embodiment of the present invention.

Referring now to FIG. 12, a schematic diagram of a vehicle 900 incorporating a gyroscopic propulsion apparatus in accordance with a preferred embodiment of the present invention is shown. Vehicle 1200 is merely representative of any type of vehicle known to those skilled in the art and may take the shape or form thereof. Vehicle 1200 will preferably have one or more gyroscopic propulsion units 600. Most preferably, Vehicle 1200 will have at least two gyroscopic propulsion units 910, where each gyroscopic propulsion unit 910 is configured and controlled as described in conjunction with FIGS. 1-8.

The presented embodiment of this device is based on six identical motor assemblies that can be placed in identical association with respect to one another forming the six faces of a cube-like device. The rotor flywheels and all other components of the resulting six motor assemblies are all identical in size, shape, and material composition. Each of the six motors operate on a set of electrical circuits that have electric leads to the motor device from electronic motion control circuits some distance from the motor assemblies themselves. A final master control circuit coordinates and operates the six individual motor controls in tandem.

Each of the six motor assemblies are most preferably designed and manufactured so that the containment, mounting, suspension, and stator components have the minimal mass possible with the rotor flywheel component designed and manufactured as maximally massive as possible, in relative terms. The six assemblies in association are not mounted or otherwise restrained except to each other.

The drawings of the six motor assemblies are based on the same kind of a brushless motor design as the ring motors with analogues components so that the same electronic circuits can drive both devices. Any brush motor design would also work to accelerate the rotor flywheels as well as non-electrical methods such as air or pneumatic drives. Turbine technologies using fuel based engine designs could also provide the drive mechanism. Any method used to turn a wheel at high angular velocity is acceptable so long as the collective drive, suspension, and containment mass is substantially less than the rotor mass.

The cube based gyroscopic propulsion unit of the present invention is able to produce additional combinations of force association that the three ring geometry disclosed in U.S. Pat. No. 7,121,159 and U.S. Pat. No. 6,705,174 cannot. The paired or opposite rotors can spin in the same direction or in complementary or opposite directions. They can also spin at potentially six different velocities making for a larger number of possible combinations of differential force association for the additional potential of overall motion control.

While the present invention has been particularly shown and described with reference to preferred exemplary embodiments thereof, it will be understood by those skilled in the art that various changes in form and details may be made therein without departing from the spirit and scope of the invention. For example, the exact number of windings used to create the brushless motors and the implementation of the control circuitry allow for many variations and equivalent embodiments without varying in significance. Similarly, the size of the various gyroscopic actuators or motors is limited only by the cost and manufacturing limitations associated with increasing the size of the gyroscopic actuators and the availability of suitable material for ensuring that the density of the rings creates the desired equal angular momentum for each gyroscopic ring at any given angular velocity. Finally, it is anticipated that advances in the art of suspended rotors will eventually allow the creation of a propulsion system where there is no physical contact between the rotor and the stator element. In this case, the rotor would be held in place by magnetic fields or other mechanisms.

The invention claimed is:

1. An apparatus comprising:
a first pair of masses configured to rotate in a first plane;
a second pair of masses configured to rotate in a second plane;
a third pair of masses configured to rotate in a third plane;
wherein at least one of said first pair of masses and said second pair of masses and said third pair of masses are configured to rotate in a direction that is the same; and
a control program, said control program being configured to control a direction of rotation and a rate of rotation for each of said first pair of masses and said second pair of masses and said third pair of masses.

2. The apparatus of claim 1 wherein:
said first pair of masses generates a first angular momentum;
said second pair of masses generates a second angular momentum;
said third pair of masses generates a third angular momentum; and
said first, second, and third angular momentums are equal.

3. The apparatus of claim 1 wherein:
said first plane is substantially perpendicular to said second plane and said third plane; and
said second plane is substantially perpendicular to said third plane and said first plane.

4. The apparatus of claim 3 wherein said first, second, and third angular momentums are equal.

5. The apparatus of claim 1 further comprising a housing, said housing containing said apparatus.

6. The apparatus of claim 1 further comprising a vehicle, said vehicle being propelled by said apparatus.

7. A method comprising the steps of:
rotating a first pair of masses in a direction that is the same for each of the masses in said first pair of masses in a first plane, said first pair of ring like masses generating a first angular momentum;
rotating a second pair of masses in a second plane, said second pair of masses generating a second angular momentum; and
rotating a third pair of masses in a third plane, said third pair of masses generating a third angular momentum.

8. The method of claim 7 wherein:
said first plane is substantially perpendicular to said second plane and said third plane;
said second plane is substantially perpendicular to said third plane; and
said first, second, and third angular momentums are substantially equal.

9. The method of claim 7 further comprising the step of using a control program to control a rate of rotation and a direction of rotation for each of said first pair of masses and said second pair of masses and said third pair of masses.

10. The method of claim 7 further comprising the step of varying said first, second, and third angular momentums by activating a control program.

11. The method of claim 7 further comprising the step of providing housing wherein each of said first pair of masses and said second pair of masses and said third pair of masses is contained within said housing.

12. The method of claim 11 further comprising the step of controlling a vehicle attached to said housing in response to said rotation of at least one of said first pair of masses and said second pair of masses and said third pair of masses.

* * * * *